Patented Mar. 13, 1951

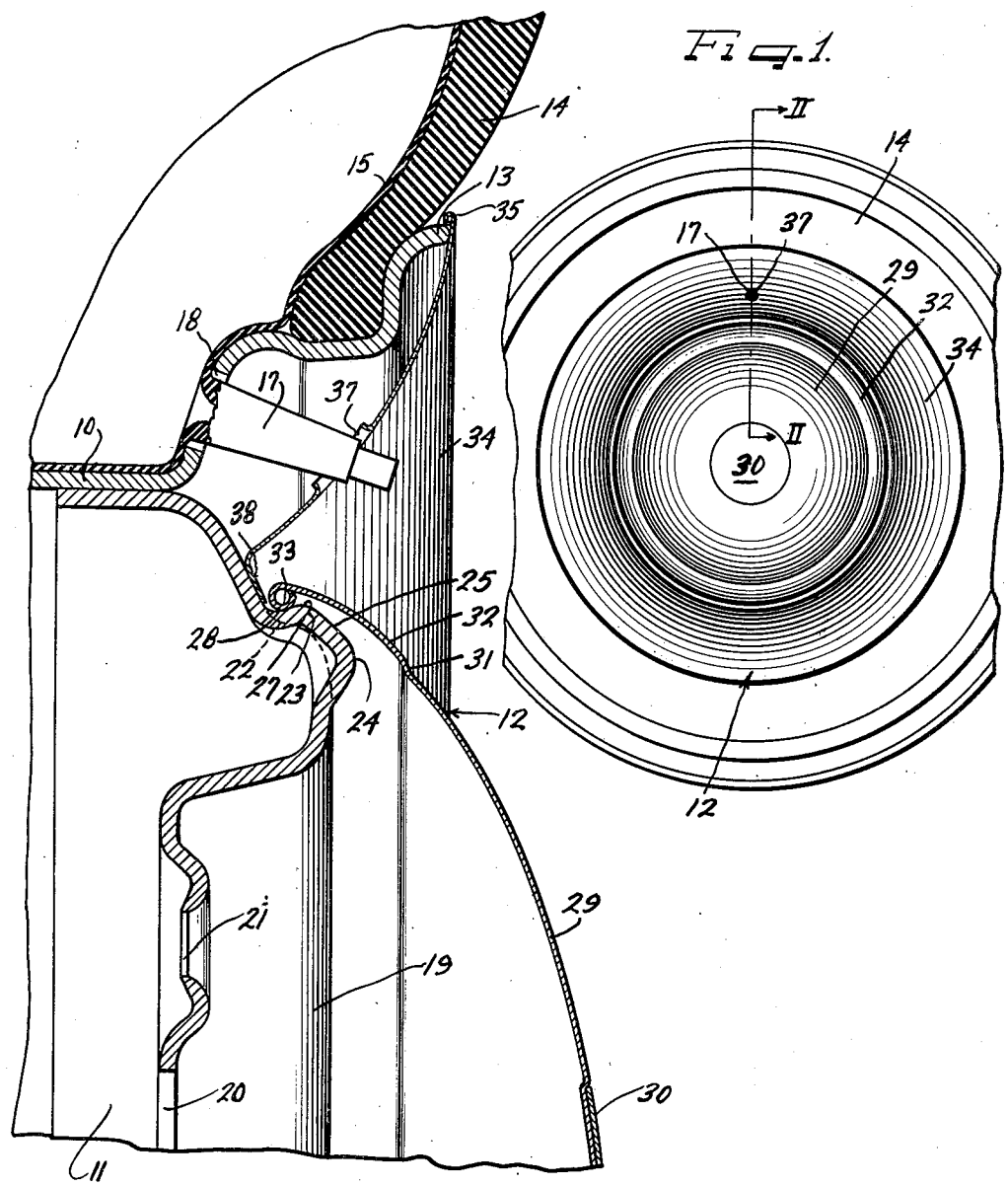

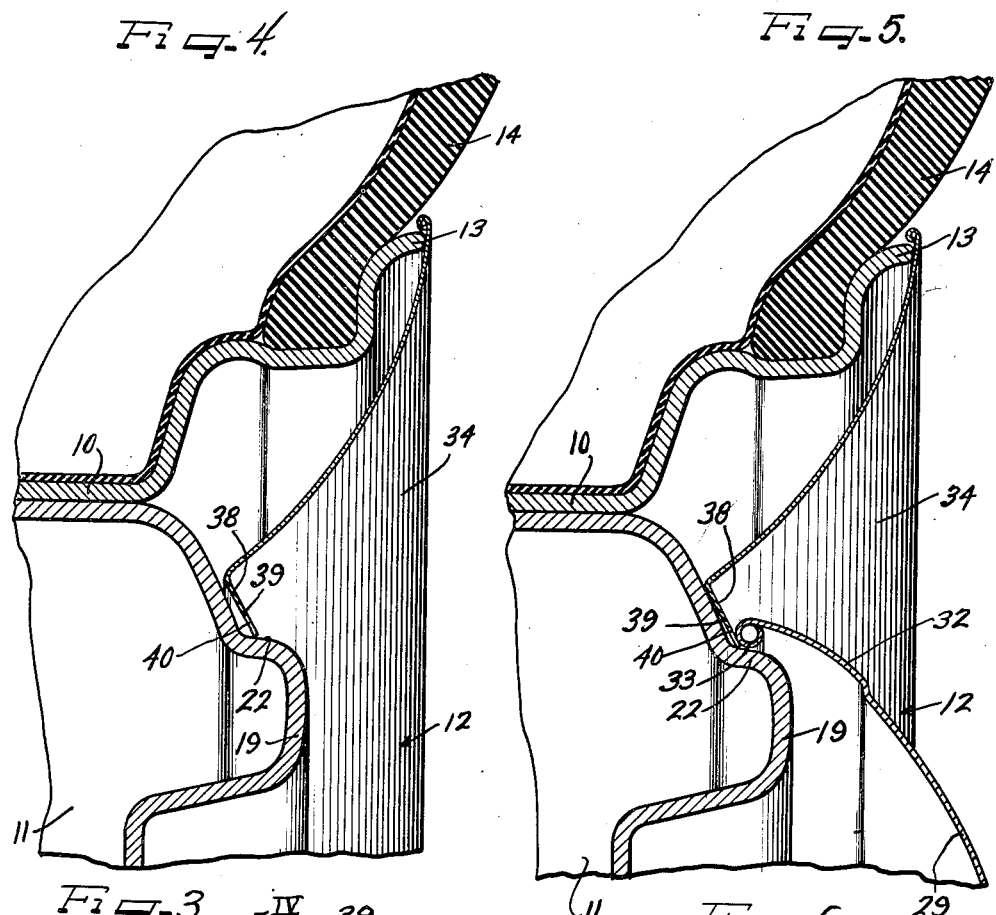
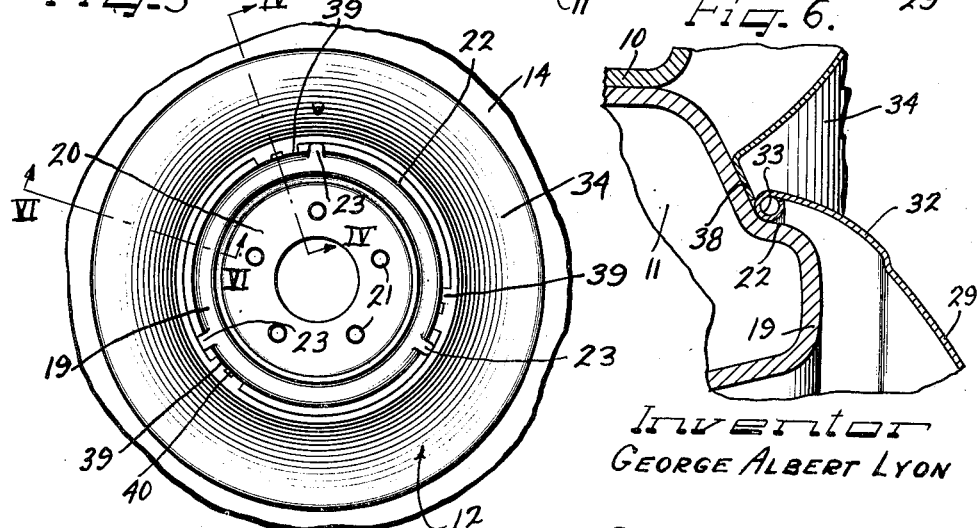

2,544,702

UNITED STATES PATENT OFFICE 2,544,702

WHEEL COVER

George Albert Lyon, Detroit, Mich.

Application January 17, 1947, Serial No. 722,660

9 Claims. (Cl. 301—37)

This invention relates to improvements in wheel structures and more particularly concerns vehicle wheels such as automobile wheels and an ornamental and protective outer side cover assembly therefor.

An important object of the present invention is to provide an improved wheel structure having integral means thereon for engagement by separate ornamental and protective cover members which in assembly appear and function as a complete cover unit.

Another object of the invention is to provide an improved wheel structure of the type including a tire rim and a load sustaining body part wherein the body part has a formation to which a trim ring cover member is engaged by a biting, wedging retaining relationship and a hub cap cover member is secured in snap-on pry-off relationship.

Still another object of the invention is to provide a wheel body having a shoulder structure to which a trim ring cover member is directly attached.

A still further object of the invention is to provide an improved wheel structure wherein a trim ring cover member is directly attached to the wheel body and a hub cap cover member is also directly attached to the wheel body in concealing relation to the juncture of the trim ring cover member with the wheel body and in such a manner that the hub cap cover member can be readily pried free but is firmly held in place in assembly and without any interference or crowding from the trim ring cover member.

Yet another object of the invention is to provide a wheel structure wherein a trim ring cover member is engaged in biting wedging relationship with the load sustaining body portion of the wheel.

It is also an object of the inventor to improve the assembly of a cover with the outer side of a vehicle wheel.

According to the general features of the invention, there is provided a wheel including a tire rim and a load sustaining body part, the body part having a generally axially outwardly extending nose portion formed at its radially outer side with a generally radially outwardly facing shoulder having at annularly spaced points thereon hub cap retaining bumps which project throughout their effective extent radially outwardly beyond the shoulder, a trim ring cover member extending in concealing relation to the tire rim and having an inner marginal structure including generally radially inwardly extending biting fingers engaging the shoulder adjacent to the respective bumps, and a hub cap cover member having a reinforced flexible margin of a diameter to fit in snap-on relation over said bumps and engaging said shoulder at points intermediate the bumps but clearing the shoulder adjacent to the bumps whereby to afford clearance for said biting fingers.

According to other general features of the invention the inner margin of the trim ring cover member is formed with a generally radially inwardly and axially outwardly extending flange from which the retaining fingers extend and which is retained in abutment with the wheel body when the fingers are in biting relation to the shoulder on the wheel body.

According to a further general feature of the invention, the outer margin of the trim ring cover member engages the flange extremity of the tire rim and the inner margin of the trim ring cover member is flexed slightly axially inwardly and maintained under such flexure by the retaining fingers whereby to hold the trim ring cover member tightly in place and free from rattling.

According to still other general features of the invention, there is provided a wheel structure including a tire rim and a wheel body, the wheel body including a generally radially outwardly facing annular shoulder, and a trim ring cover member conceals the tire rim and has a generally radially inwardly extending biting finger formation retainingly engaging the shoulder on the wheel body.

Other objects, features and advantages of the present invention will be readily apparent from the following detailed description of a preferred embodiment of the invention taken in conjunction with the accompanying drawings, in which:

Figure 1 is a side elevational view of a wheel structure embodying the features of the present invention;

Figure 2 is an enlarged radial sectional view taken substantially in the plane of line II—II of Fig. 1;

Figure 3 is a fragmentary side elevational view of the wheel structure with the hub cap cover portion removed to reveal how the trim ring cover member is secured in place;

Figure 4 is an enlarged radial sectional view taken substantially on the line IV—IV of Fig. 3;

Figure 5 is a radial sectional view substantially like Fig. 4 but showing the assembly with the hub cap cover portion in place; and Figure 6 is a fragmentary, radial sectional view, taken substantially in the plane of line VI—VI of Fig. 3, but showing the hub cap cover portion in place.

As shown on the drawings:

A wheel structure according to the present invention comprises a tire rim 10 coaxial with a load sustaining wheel body 11, and a composite wheel cover 12. The tire rim 10 may be of the multi-flanged drop center type including an outer side terminal flange 13 and is adapted to support a tire 14 inflated by means of an inner tube 15 which has a valve stem 17 protruding through an opening 18 in the side of the tire rim.

The wheel body 11 may be formed as a sheet metal stamping and is secured in any suitable manner to the base flange of the tire rim 10. An axially outwardly projecting annular reenforcing nose bulge 19 on the wheel body concentrically defines a central dished depression within which is a central bolt-on flange 20 having bolt apertures 21 through which extend the bolts or cap screws for attaching the wheel to a part of an axle of a vehicle such as an automobile (not shown).

Means are provided on the wheel body for direct attachment thereto of the components of the cover 12. To this end the radially outer side of the nose portion 19 of the body is formed to provide a generally radially outwardly facing annular shoulder 22 which is interrupted at symmetrically annularly spaced points by generally radially outwardly and axially outwardly extending cover retaining bumps 23. On an ordinary size wheel these bumps are preferably three in number.

Each of the bumps 23 comprises an axially outward peak 24 which projects substantially axially outwardly beyond the adjacent surface of the body nose bulge 19. Slanting generally radially outwardly and axially inwardly from the peak 24 is a cam lead-in surface 25 which, it will be noted in Fig. 2, also is in substantially spaced relation to the adjacent portion of the nose bulge 19 and the axially outer portion of the shoulder 22. A rounded hump 27 at the axially inner and radially outer extremity of the cam surface 25 leads to a generally axially inwardly and radially inwardly extending, and generally radially outwardly axially inwardly facing, cover retaining shoulder 28. This retaining shoulder 28 is generally convergent with the wheel body 11 radially outwardly of the annular shoulder 22 and throughout its extent is in substantial spaced relation to the shoulder 22. As shown, the cover retaining bumps 23 are adapted to be formed integrally from the material of the wheel body 11 as by pressing the same therefrom in the manufacture of the wheel body.

Retainingly engageable with the cover retaining bumps 23 is a circular hub-cap-like cover member 29 which comprises one of the two principal components of the cover assembly 12. While the hub cap cover member 29 may be of any preferred shape, consistent with certain requirements for flexibility to adapt it for ready snap-on pry-off engagement with the bumps 23, the generally smooth relatively flat, large radius convex shape shown is preferred. The central portion of the hub cap cover member 29 may be slightly depressed and provided with a reinforcing medallion or name plate 30. Adjacent to but spaced from its periphery, the hub cap cover member 29 is formed with an annular reinforcing rib structure 31 affording a line of demarcation between the main body of the cover and the marginal portion thereof, identified at 32, and formed on a slightly smaller radius to increase the flexibility thereof, the edge of the marginal portion being preferably curled inwardly upon itself to provide a reinforcing bead 33 which projects generally radially inwardly.

The inside diameter of the circle described by the reinforcing bead 33 is slightly greater than the diameter of the circle described by the wheel body shoulder 22 but less than the diameter of a circle projected about the cover retaining shoulders 28 of the bumps 23. As a result the hub cap cover member 29 is adapted to be mounted upon the wheel by pressing it axially inwardly against the cover retaining bumps 23 whereby the circumferential reinforcing bead 33 cams generally radially outwardly on the lead-in cam surfaces 25, causing the marginal portion 32 of the cover to be flexed generally radially outwardly in the areas thereof at and adjacent to the bumps 23, while the intermediate areas of the marginal portion 32 draw radially inwardly and slightly axially inwardly to compensate for the radially outward deflection at the bumps. This, of course, places the marginal portion 32, and especially the bead 33, under substantial resilient tension so that after the bead 33 passes the radially outer hump or humps 27 of the one or more bumps 23 over which it must be finally pressed in mounting the cover, the bead 33 snaps resiliently into engagement with the respective cover retaining shoulders 28, substantially as shown in Fig. 2.

At the same time, the intermediate portions of the bead 33 enter into engagement with the annular wheel body shoulder 22 at substantially the juncture thereof with the wheel body 11. Since those portions of the bead 33 which are in engagement with the retaining shoulders 28 of the bumps remain under some radially outward resilient deflection, and the annular shoulder 22 does not permit the intermediate portions of the bead 33 to maintain the full radially inward deflection which would normally prevail but tends to spread the indrawn intermediate portions of the bead radially outward, there is a strong radially inward resilient counteraction in those portions of the bead 33 in engagement with the retaining shoulders 28. This causes the latter portions of the bead 33 to assume a strong retaining grip upon the shoulders 28. At the same time engagement of the intermediate portions of the bead 33 with the wheel body at the juncture of the wheel body and the annular shoulder 22 restrains the bump-engaging portions of the bead against normal tendency to cam resiliently into the groove afforded at the juncture of the retaining bumps 28 and the wheel body. Hence, the bump-engaging portions of the bead 33 remain in spaced relation to the wheel body. This is of advantage, for one thing, in affording space for insertion of a pry-off tool between the bead 33 and the wheel body for prying the hub cap cover member free from the retaining bumps 23 when it is desired to remove the same for access to the central portion of the wheel.

In addition to its function in retention of the hub cap cover member 29, the annular wheel body shoulder 22 serves as retaining means for a second cover component 34 which is in the form of a trim ring of such magnitude and extent as to substantially conceal the outer side of the tire rim 10 and the juncture of the tire rim and the wheel body 11. To this end, the cover member 34 is preferably formed from suitable sheet material having the outer edge thereof appropriately reinforced as by means of a bead 35 or the like that encircles the flange 15 of the tire rim adjacent to the juncture of the tire 14 with the rim and substantially conceals such juncture.

From the reinforcing bead 35 the trim ring cover member 34 extends generally radially inwardly and axially inwardly on a curving contour which is preferably in substantial simulation of an inward extension of the side wall curvature of the tire 14. Where the outer surface of the cover member 34 is light colored or white, the general impression afforded is that of a relatively massive tire having an inner white side wall portion. A suitably located, preferably marginally flange reinforced aperture 37 in the cover member 34 accommodates the outer portion of the valve stem 17 which projects therethrough.

The radially inner extent of the trim ring cover member 34 is such as to engage the wheel body 11 radially inwardly from the juncture of the wheel body and tire rim but radially outwardly spaced from the annular wheel body shoulder 22. At its inner margin the trim ring cover member is preferably formed with a generally radially inwardly and axially outwardly diverging reinforcing flange 38 which is adapted in the full assembly of the trim ring cover member with the wheel to rest against the wheel body.

The edge of the inner marginal trim ring flange 38 is preferably of such diameter as to clear the hub cap cover member retaining bumps 23 when the trim ring cover member 34 is concentrically disposed on the wheel. This also means that the inner margin edge is substantially spaced from the body shoulder 22 in concentric assembly. Thereby the trim ring cover member can be readily mounted by pressing it axially inwardly toward the wheel.

For retaining the trim ring cover member 34 on the wheel, a plurality of biting finger extensions 39 (Figs. 3, 4 and 5) are provided on the inner marginal reinforcing flange 38 to extend generally radially inwardly into biting, wedging engagement with the annular wheel body shoulder 22. The biting fingers 39 are preferably relatively narrow and of the same number and general relative spacing as the cover retaining bumps 23 and are adapted to engage the wheel body shoulder 22 adjacent to the respective bumps 23. In this manner, the fingers 39 are disposed in such relation to the retaining and reinforcing bead 33 of the hub cap cover member as to extend therebehind in such areas of the bead as are, in assembly, spaced from the adjacent portion of the wheel body 11. Thus, the retaining fingers 39 avoid any interference with or crowding of the tensioned, and effective seating of the bead 33 against the wheel body at the base of the annular shoulder 22 at the substantially mid-intermediate respective points between adjacent cover retaining bumps 23 where the reinforcing flange 38 entirely clears the bead-engaged area of the wheel body. This affords distinct advantages in that the retaining and reinforcing bead 33 remains free from any tensional interference or crowding. There is, of course, no danger of the narrow interposed retaining fingers 39 where they are interposed between the spaced portions of the bead 33 adjacent the bumps 23 unbalancing or crowding the retaining engagement of the bead 33 with the bump shoulders 28 and causing the hub cap cover portion to pop off accidentally.

In mounting the trim ring cover member 34, the retaining fingers 39 are engaged with the annular wheel body shoulder 22 closely adjacent to the bumps 23 and the cover pressed axially inwardly until the retaining fingers 39 are at least partially engaged in wedging, biting relation to the shoulder.

By preference, the cross sectional contouring of the trim ring cover member 34 is such that as it is being mounted, the radially outer margin thereof engages the tire rim terminal flange 13 before the radially inner reinforcing margin 38 engages the wheel body, so that upon further slight inward movement of the radially inner portion of the trim ring cover member the entire cover member is maintained under slight axially inward tension whereby to maintain it snug and rattle-free and also to compensate for any possible axial variation in the assembly of the tire rim 10 and the wheel body 11. Thus, the initial mounting of the trim ring cover member 34 may proceed to substantially the extent shown in Fig. 4.

Thereafter, upon mounting the hub cap cover member 29, the portions of the reinforcing and retaining bead 33 thereof immediately contiguous the retaining fingers 39 of the trim ring cover member are adapted to be forced axially inwardly against the retaining fingers 39 to drive them fully home into complete, substantially permanent retaining biting engagement with the base portion of the retaining shoulder 22. Thereafter, the retaining fingers 39, fully bitingly retaining their position, will not spring from such position, thus leaving the reinforcing and retaining bead 33 free from any functional interference. This final setting of the retaining fingers 39 also drives the reinforcing flange 38 against the wheel body and places the trim ring cover member 34 under full anti-rattle tension.

It will also be observed from Fig. 2 that since the reinforcing flange 38 clears the retaining bumps 23, and the reinforcing and retaining bead 33 at the bumps is flexed into spaced relation to the adjacent portion of the wheel body, the extremity of the flange 38 behind the bead 33 at the bumps 23 is cleared by the retaining bead 33 and thereby interposes no functional interference with the bead. As seen in Fig. 6, the portions of the flange 38 intermediate the retaining fingers 39 lie in slightly radially outwardly spaced relation to the retaining bead 33. However, since the radially outward portion of bead 33 and the adjacent marginal area of the hub cap cover portion 32 extend radially outwardly beyond the edge of the flange, the juncture of the two cover members is effectively concealed from view.

Should it be desired to remove the trim ring cover member 34, it may be effected by first removing the hub cap cover member 29 by prying it free from the retaining bumps 23 to expose the retaining fingers 39. Thereupon a pry-off tool may be inserted within pry-off notches 40 formed in the respective edges of the retaining fingers, and the retaining fingers successively pried free from the shoulder 22 whereby to release the trim ring cover member. Replacement of the trim ring cover member 34 is then adapted to be effected in the manner already described.

The wheel and cover assembly presents an attractive outer appearance since the cover 12 entirely conceals the outer side of the tire rim and the multiplicity of flanges and functional contours of the tire rim and the wheel body. In assembly, the component cover members 29 and 34 appear as a complete cover unit, the juncture thereof being concealed from view.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure including a tire rim and a load sustaining body part, the body part having a generally axially outwardly extending nose portion formed at its radially outer side with a generally radially outwardly facing shoulder having at annularly spaced points thereon hub-cap-retaining bumps which project throughout their effective extent radially outwardly beyond the shoulder, a trim ring cover member extending in concealing relation to the tire rim and having an inner marginal flange structure including generally radially inwardly extending biting fingers engaging said shoulder adjacent to the respective bumps, and a hub cap cover member having a reinforced flexible margin of a diameter to fit in snap-on relation over said bumps and engaging said shoulder at points intermedate the bumps but clearing the shoulder adjacent to the bumps whereby to afford clearance for said biting fingers.

2. In a wheel structure, including a tire rim and a load sustaining body part, the body part having a generally axially outwardly extending nose portion formed at its radially outer side with a generally radially outwardly facing shoulder having at annularly spaced points thereon hub-cap-retaining bumps which project throughout their effective extent radially outwardly beyond the shoulder, a trim ring cover member extending in concealing relation to the tire rim and having an inner marginal flange structure including generally radially inwardly extending biting fingers engaging said shoulder adjacent to the respective bumps, and a hub cap cover member having a reinforced flexible margin of a diameter to fit in snap-on relation over said bumps and engaging said shoulder at points intermediate the bumps but clearing the shoulder adjacent to the bumps whereby to afford clearance for said biting fingers, the inner margin of the trim ring cover member being formed with a generally radially inwardly and axially outwardly extending flange from which the retaining fingers extend, said flange being retained in abutment with the wheel body when the fingers are in biting relation to the shoulder on the wheel body.

3. In a wheel structure including a tire rim and a load substaining body part, the body part having a generally axially outwardly extending nose portion formed at its radially outer side with a generally radially outwardly facing shoulder having at annularly spaced points thereon hub-cap-retaining bumps which project throughout their effective extent radially outwardly beyond the shoulder, a trim ring cover member extending in concealing relation to the tire rim and having an inner marginal flange structure including generally radially inwardly extending biting fingers engaging said shoulder adjacent to the respective bumps, and a hub cap cover member having a reinforced flexible margin of a diameter to fit in snap-on relation over said bumps and engaging said shoulder at points intermediate the bumps but clearing the shoulder adjacent to the bumps whereby to afford clearance for said biting fingers, the outer margin of the trim ring cover member engaging the flange extremity of the tire rim and the inner margin of the trim ring cover member being flexed slightly axially inwardly and maintained under such flexure by the retaining fingers whereby to hold the trim ring cover member tightly in place and free from rattling.

4. In a wheel structure including a tire rim and a wheel body having an annular generally radially outwardly facing shoulder, said shoulder having cover retaining generally radially outwardly extending bumps at symmetrically spaced annular intervals thereon, a trim ring cover member concealing the tire rim and having generally radially inwardly extending retaining fingers in biting wedging engagement with said shoulder, a hub cap cover member retainingly engaging said bumps, said hub cap cover member being adapted to be removed by prying the same free from said bumps, said fingers including pry-off notches for engagement of the fingers by a pry-off tool for prying the same free from said shoulder, the diameter of said hub cap cover member being such as to conceal said fingers and the inner margin of said trim ring cover member in the assembly.

5. In combination in a wheel and cover assembly, the wheel including a tire rim and a wheel body, the wheel body having a generally radially outwardly facing annular shoulder formed at intervals with cover retaining bumps protruding radially and axially outwardly beyond said shoulder, a hub cap cover member having a resiliently flexible marginal formation of an inside diameter greater than said shoulder and less than a circle projected about the radially outer retaining surfaces of the bumps, said flexible marginal formation being flexed radially and axially outwardly in engagement with said bumps and into tensioned engagement with said shoulder and the contiguous portion of the wheel body intermediate the bumps, with those portions of said marginal formation between the bump contacting portions and the shoulder contacting portions being in spaced relation to the opposing portions of the wheel body, and a trim ring cover member having radially inwardly projecting retaining fingers extending into retaining engagement with said shoulder within the clearances afforded by said spaced portions of said marginal formation of the hub cap cover member.

6. In combination in a wheel and cover assembly, the wheel including a tire rim and a wheel body, the wheel body having a generally radially outwardly facing annular shoulder formed at intervals with cover retaining bumps protruding radially and axially outwardly beyond said shoulder, a hub cap cover member having a resiliently flexible marginal formation of an inside diameter greater than said shoulder and less than a circle projected about the radially outer retaining surfaces of the bumps, said flexible marginal formation being flexed radially and axially outwardly in engagement with said bumps and into tensioned engagement with said shoulder and the contiguous portions of the wheel body intermediate the bumps, with those portions of said marginal formation between the bump contacting portions and the shoulder contacting portions being in spaced relation to the opposing portions of the wheel body, and a trim ring cover member having radially inwardly projecting retaining fingers extending into retaining engagement with said shoulder within the clearances afforded by said spaced portions of said marginal formation of the hub cap cover member, said marginal formation extending radially outwardly to an extent to conceal the inner edge of the trim ring cover member from view.

7. In a cover for disposition at the outer side of a vehicle wheel of the type having a tire rim and a load sustaining body part formed with a radially outwardly facing shoulder including a series of annularly spaced radially outwardly projecting hub cap retaining bumps thereon, an annulus adapted for substantially concealing the tire rim and having a generally radially inwardly and axially inward convex cross sectional formation, the radially inner margin of the annulus comprising a series of generally radially inwardly and axially outwardly extending retaining fingers formed in one piece with the body of the annulus and of a common tip diameter for entering into wedging, biting engagement with the shoulder intermediate the bumps.

8. In a cover for disposition at the outer side of a vehicle wheel of the type having a tire rim and a load sustaining body part formed with a radially outwardly facing shoulder including a series of annularly spaced radially outwardly projecting hub cap retaining bumps thereon, an annulus adapted for substantially concealing the tire rim and having a generally radially inwardly and axially inward cross sectional formation, the radially inner margin of the annulus comprising a series of generally radially inwardly and axially outwardly extending retaining fingers formed in one piece with the body of the annulus and of a common tip diameter for entering into wedging, biting engagement with the shoulder intermediate the bumps, each of said fingers having a pry-off tool notch in the tip thereof.

9. In a cover for disposition at the outer side of a vehicle wheel having a tire rim and a load-sustaining body including a radially outwardly facing shoulder, the cover comprising a trim annulus the body of which extends generally radially and axially inwardly and has an inner marginal flange diverging therefrom generally radially inwardly and axially outwardly and adapted to seat against the wheel body radially outwardly from said shoulder, the inner diameter of the flange being smaller than the outer diameter of the shoulder, said flange having a plurality of generally radially inward finger extensions adapted for wedging, biting engagement with said shoulder to retain the annulus on the wheel.

GEORGE ALBERT LYON.

REFERENCES CITED

The following references are of record in the file of this patent:

UNITED STATES PATENTS

| Number | Name | Date |
|---|---|---|
| 1,920,575 | Lyon | Aug. 1, 1933 |
| 2,135,757 | Lyon | Nov. 8, 1938 |
| 2,263,243 | Lyon | Nov. 18, 1941 |